United States Patent [19]

Zimmerly

[11] Patent Number: 5,450,878
[45] Date of Patent: Sep. 19, 1995

[54] MANIFOLD VALVE ASSEMBLIES FOR DAIRY PRODUCT FLOW CONTROL

[75] Inventor: Robert D. Zimmerly, Kenosha, Wis.

[73] Assignee: Tetra Laval Holdings & Finance, S.C., Pully, Switzerland

[21] Appl. No.: 357,445

[22] Filed: Dec. 16, 1994

[51] Int. Cl.⁶ .............................................. F16K 11/00
[52] U.S. Cl. ..................................... 137/861; 137/597
[58] Field of Search ................................ 137/597, 883

[56] References Cited

U.S. PATENT DOCUMENTS

| | | | |
|---|---|---|---|
| 3,134,395 | 5/1964 | Glasgow | 137/597 X |
| 3,464,447 | 9/1969 | Jones | 137/883 |
| 5,390,694 | 2/1995 | Zimmerly et al. | 137/597 X |

*Primary Examiner*—John C. Fox
*Attorney, Agent, or Firm*—Ryan, Maki & Hoenfeldt

[57] ABSTRACT

A manifold valve assembly, composed of a plurality of valve subassemblies, each of the subassemblies including at least five valves. At least a first one of the valves in each subassembly is in fluid flow communication with a supply source, and at least a second one of the valves in each subassembly is in fluid flow communication with a fluid distribution conduit and at two of the valves in each subassembly, when open, discharge fluid into a drain and serve as leak detector ports. A fifth valve, when closed, separates the first and third valves from the second and fourth valves, the valves being interconnected by fluid flow conduits to selectively allow flow of fluids from the supply source to the distribution conduit and to prevent flow thereof to a drain.

11 Claims, 2 Drawing Sheets

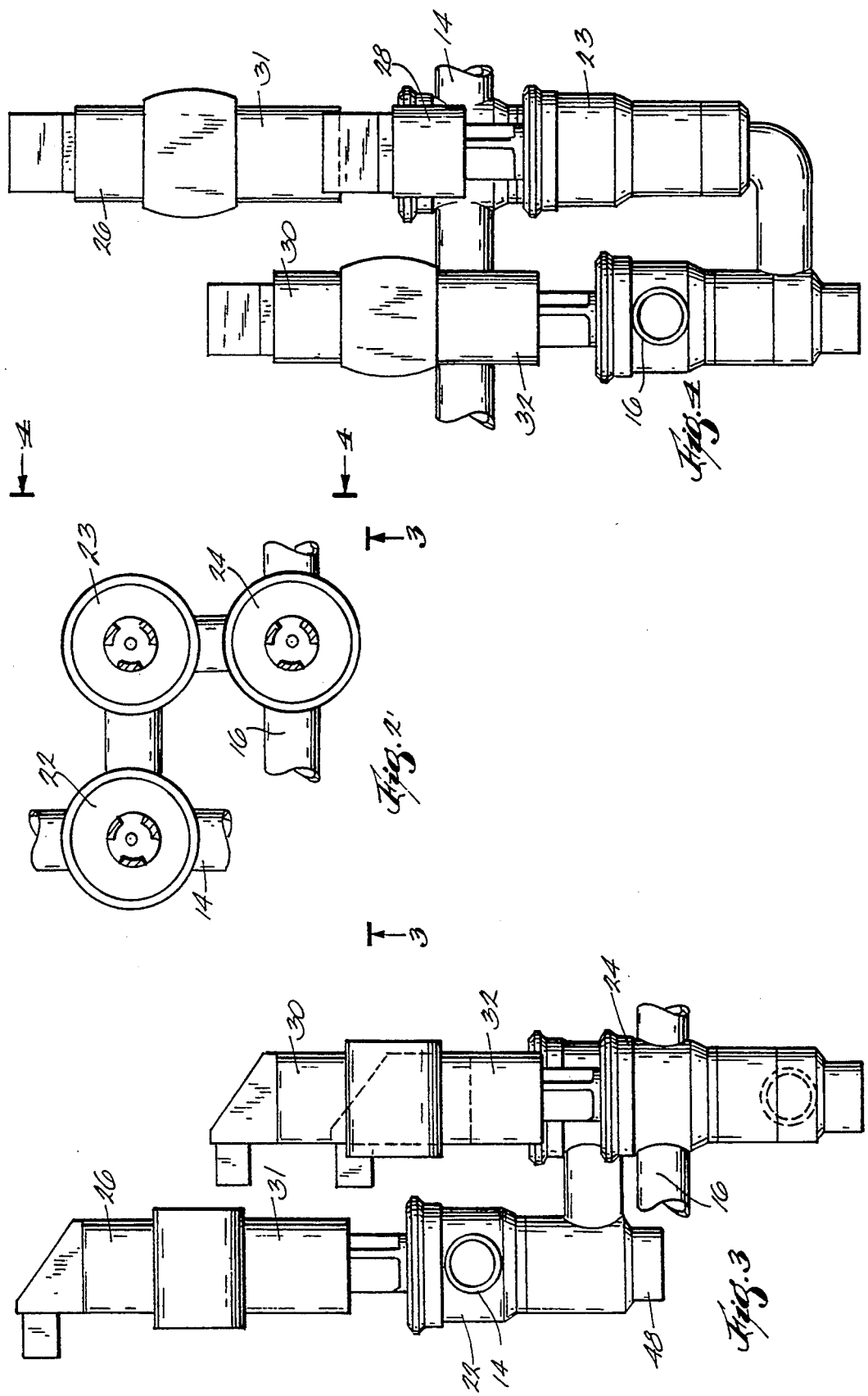

MANIFOLD VALVE ASSEMBLIES FOR DAIRY PRODUCT FLOW CONTROL

BACKGROUND OF THE INVENTION

This invention relates to valves for controlling the flow of fluids, and particularly to block-and-bleed valves assembled together to form manifolds for controlling the flow of fluids from multiple sources to multiple delivery destinations. Certain concerns unique to the dairy food processing industry are addressed.

It is common in the food packaging industry to have a need to connect a number of sources of a fluid, such as different types of milk, to a number of different filler machines to fill containers, such as gallons, half-gallons, quarts and so on. To date, these connections have been accomplished in the form of a manifold, including a number of lines from the source tanks crossing a number of lines leading to the filler machines, with the valves being provided to permit or prevent flow of fluid from any selected, one or more of the source tanks, to any chosen, one or more of the filler machines. This arrangement creates a need for an extremely large number of valves, however. For instance, a single manifold connecting ten source tanks to ten filler machines, would use over a hundred valves to accomplish the control which is necessary and desired.

In processing dairy food liquids, it is particularly important that the pipes, valves, and related equipment be periodically sanitized, but applicable regulations require that, where food products and sanitizing solutions are simultaneously present in the same system, that at least two closed valves always separate the two fluids in order to absolutely minimize the possibility of inadvertently intermixing them.

This invention relates to improvements to the apparatus described above, and to solutions to some of the problems raised, or not solved thereby. Briefly, the invention provides a manifold valve assembly, composed of a plurality of valve subassemblies, each of the subassemblies including at least five valves. At least a first one of the valves in each subassembly is in fluid flow communication with a supply source, and at least a second one of the valves in each subassembly is in fluid flow communication with a fluid distribution conduit and at two of the valves in each subassembly, when open, discharge fluid into a drain or clean-in place fluid collection conduit. A fifth valve, when closed, separates the first and third valves from the second and fourth valves, the valves being interconnected by fluid flow conduits to selectively allow flow of fluids from the supply source to the distribution conduit and to prevent flow thereof to the atmosphere.

SUMMARY OF THE INVENTION

The present invention includes a manifold valve assembly, formed of a plurality of valve sub-assemblies, each of said subassemblies comprising at least five valves. At least one of the valves in each subassembly being in fluid flow communication with a supply source, and at least one of the valves in each subassembly being in fluid flow communication with a fluid distribution conduit and at least two of the valves in each subassembly, when open, discharge fluid to a discharge drain and serve as leak detector ports. Preferably each subassembly includes first and second valve bodies, each body having at least one inlet port and a plurality of outlet ports with two valve members located in each of the first and second valve bodies.

DESCRIPTION OF THE DRAWINGS

FIG. 2 is a top view of the assembly of FIG. 1;

FIG. 3 is an elevational cross-sectional view taken along line 3—3 of FIG. 2; and FIG. 4 is an elevational cross-sectional view taken along line 4—4 of FIG. 2.

DESCRIPTION OF A PREFERRED EMBODIMENT

Figure 1:
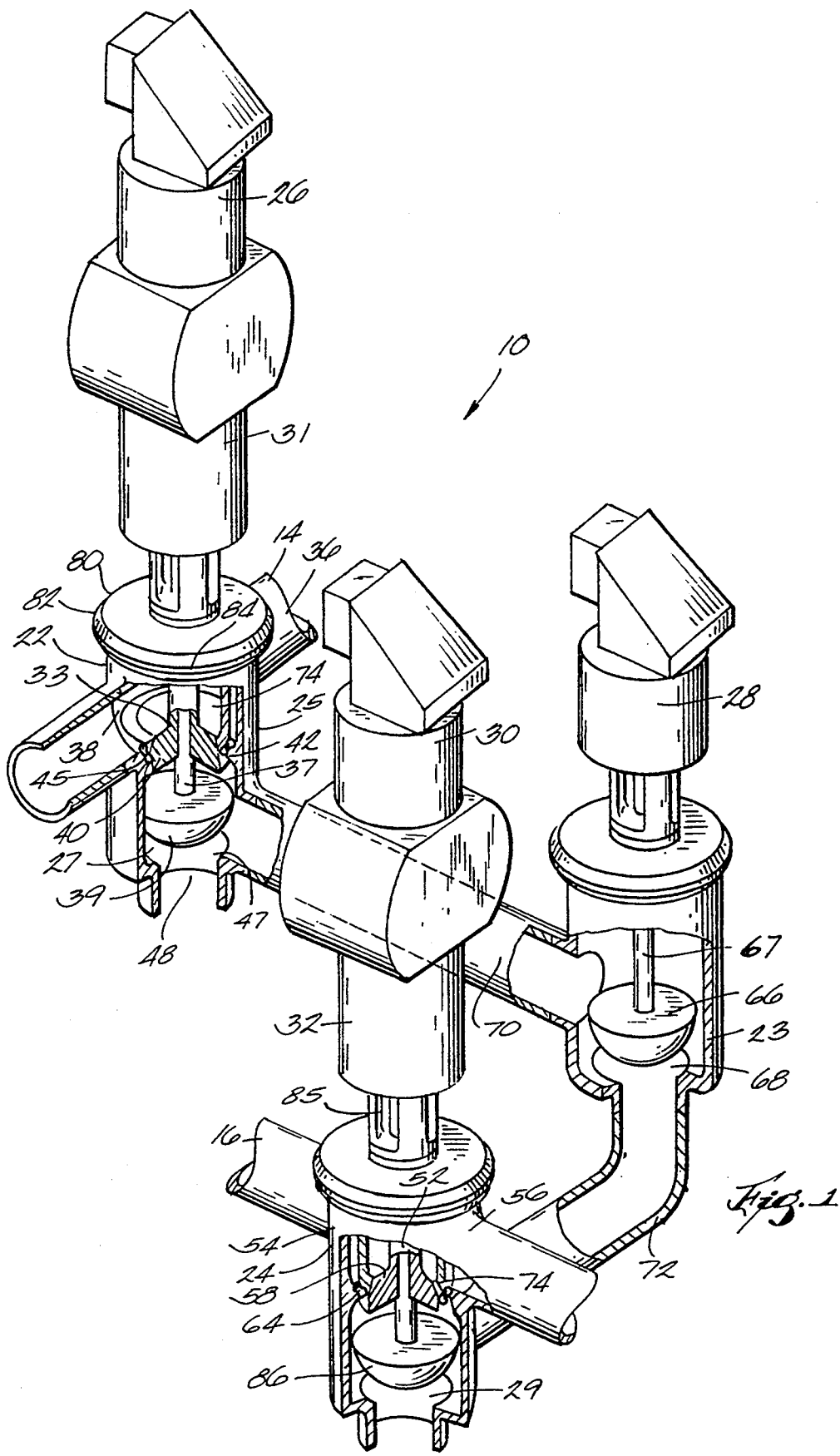
FIG. 1 is a perspective, partially cut away, view of a manifold valve assembly constructed according to one embodiment of the invention.

Referring now to FIG. 1, there is shown a manifold valve assembly 10, constructed according to one embodiment of the invention. The manifold valve assembly 10 is connected to and receives supply from a number of supply conduits 14 which are interconnected with a plurality of such valve assemblies to form a manifold assembly. Supply conduits 14 are connected to sources of fluid such as tanks of liquids. The manifold assembly 10 is also connected to and supplies the fluid to a number of distribution conduits 16 which in turn are connected to destinations such as filler machines for filling containers with one or more of the fluids from the fluid supply tanks. The purpose of the manifold assembly is to control and selectively control the flow of fluid from one or more predetermined sources to predetermined destinations. The manifold assembly includes one supply tube 14 for each fluid supply source and one delivery tube 16 for each destination. While the manifold assembly 10 shown in FIG. 1 is fragmentary, it will be understood that the invention may be applied to any number of fluid supplies and destinations.

As can be seen from FIG. 1, this manifold assembly results in a crossed pattern of supply tubes 14 and delivery tubes 16. The supply tubes 14 and delivery tubes 16 do not actually intersect, but rather are positioned parallel in sets, in parallel planes, with the supply set being in the upper plane and the delivery set preferably being in the lower plane. According to the embodiment of the invention shown in the drawings, the delivery tubes 16 are positioned in a plane beneath the plane of the supply tubes 14 so that fluids will tend to drain toward the delivery tubes by gravity flow. One manifold valve assembly 10 is provided at each crossing point of a supply tube 14 with a delivery tube 16.

Each manifold valve assembly 10 includes in effect five separate valve bodies, a supply valve body 22, a delivery valve body 24, an intermediate valve body 23 and a pair of drain port or "leak detector" valve bodies 27 and 29. In the arrangement of FIGS. 1-4 the valve bodies 22 and 27 are formed at opposite ends of a valve cylinder or housing 25. Each of these valve bodies 22, 23, 24, 27 and 29 is supplied with its own actuator assembly 26, 28, 30, 31 and 32, respectively. Valve bodies 24 and 29 are interconnected and linearly aligned with each other. Valve body 29 is connected to valve cylinder 23 at its lower end.

The interior detail of each valve body can be best seen by reference to FIG. 1. Supply valve body 22 includes its own actuator 31, having a hollow annular actuator rod 33, actuatable between open and closed positions, as shown. Valve body 22 has, at its top, a pass-through section including an inlet 36 substantially aligned with an outlet 38. The inlet 36 and outlet 38 of the supply valve body 22 connect to and in effect form part of one of the supply tubes 14, permitting flow of fluid from upstream destination valves at all times regardless of whether valve 22 is open or closed.

A valve plug 40 is attached to the end of a valve stem which is in turn attached to actuator rod 33. Plug 40 is provided to close a port 42 at the top of valve body 25. The perimeter of port 42 is defined by a valve seat 45. The actuator 31 has two positions, one where port 42 is open and the other where port 42 is closed.

As seen, valve 27 is also a simple actuator type valve. Actuator 26 operates in actuator rod which is connected to a valve stem 37. A valve plug 39 is affixed to or integrally formed with valve stem 37. Valve stem 37 is located concentrically within stem 33. Valve plug 39 is adapted to fit into and close a valve seat 47 which defines a port 48 at the bottom of the housing of valve 27 so as to close a drain port 48.

Also, delivery valve body 24 has its own actuator 32 connected to an actuator rod 52, actuatable between two positions. Delivery valve body 24 has a pass-through section including an inlet 54 substantially aligned with an outlet 56 which, in effect form part of one of the delivery tubes 16, permitting free flow of fluid to downstream delivery valves at all times regardless of the position of the valve 24.

As with supply valve body 25, actuator rod 85 has affixed thereto a valve stem, by any suitable removable means, such as by threading. A valve plug 58 is affixed to or integrally formed with the valve stem 52. Once the valve stem is assembled to the actuator rod 85, plug 58 is positioned within delivery valve body 24 to close a port 64. As was the case with supply actuator 26, delivery actuator 32 has two positions, one where port 64 is open and the other where port 64 is closed. As in the case of the other above-described valves, valve stem 86 is actuated by actuator 30.

Valve 23 is utilized to provide additional separation between the supply pipes 14 and delivery pipes 16. In this case, a valve 23 includes a valve plug 66 connected to a valve stem 67 which closes a valve port 68. Valve 23 is, thus, also a simple single actuator valve. Valve 23 has two positions driven by actuator 28. The extended position valve port 68 is closed, and in the retracted position said port is open. Valve 23 is connected to the supply valve 25 by means of a conduit 70 and to delivery valve 24 by means of another conduit 72.

Each of the three valves of the assembly can thus be individually controlled. It will be apparent that when supply valve 22 is open, valve 23 is open, delivery valve body 24 is also open, and valves 27 and 29 is closed, that fluid can flow from supply tube 14 into delivery tube 16. Then, to discontinue the flow, valve 22 is closed while valve 29 remains closed for a time sufficient to allow gravity drainage of liquids remaining in the valve bodies through valve 24 into delivery tube 16. Subsequently, valve 24 is closed. Drain port valves 27 and 29 are then opened without consequential waste of liquid.

It will also be apparent that, as needed, the supply tubes can be cleaned by pulsation of clean-in-place solution therein and drained without affecting the delivery tubes, and vice-versa. For example, valves 22 and 27 can be opened and closed for cleaning, and valve 24 closed, so that the supply side is cleaned without affecting the delivery side, or vice-versa.

The invention calls for structure permitting easy removal of the actuator and valve stem from any one of the valves at any time. Using a supply valve body 22 and drain port valve 27 as an example, the valve plugs and upper valve seat 45 are carried by a valve bonnet 74. Valve stems 33 and 37 are inserted through an opening in the bonnet 70. The actuators 26 and 31 together with their associated valve stems, rods and plugs can be installed or removed as a unit that also includes upper valve seat 45. The bonnet 74 has a flange 80 which flares outward from the central opening, to fit onto a mating flange surface 82. Upon assembly, the two flanges are clamped together by a suitable clamp 84. Sealing means, such as O-rings or gaskets can be provided where needed in the assembly to ensure against leakage.

If one of the actuators 26 or 31 requires service, or if one of the valve plugs 40 or 39 needs replacing or other service, the clamp 84 is opened and the actuators and bonnet 74 removed. Valve 24 is constructed with a bonnet 74 similar to that described for valves 22 and 27.

It is not unusual for the delivery tubes 16 to be smaller in size than the supply tubes 14, such as 2 inch delivery tubes being used with 3 inch supply tubes.

Valve seat 45 is integral with a cage-type structure carried by bonnet 74 which is formed with openings so as not to impede the flow of fluids through the pass-through channel, thereby permitting free flow of fluids through tubes 14.

The embodiments shown in all of FIGS. 1–4 utilizes the same arrangement for attachment of the valve bonnet and other operational details shown in my U.S. Pat. No. 5,232,023 issued Aug. 3, 1993, the entire disclosure of which is incorporated herein by reference. These are, therefore, not repeated herein. It will be noted that by use of a single valve housing with each outlet therefrom capable of gravity drainage of liquids therefrom, a great reduction of waste is achieved. Cleaning of either the supply side or distribution side of the assembly while maintaining separation of the opposite side is also facilitated. It will also be noted that both of the stems in valves 22 and 27 can travel a sufficient distance to facilitate cleaning of the valve components.

Note that, in operation, ports 48 and 29 can be closed by means of valve plugs 39 and 86, respectively, prior to opening of ports 42, 68 and 64. Thus, no waste of fluid occurs when the valves are in motion. It will be noted that each embodiment of the invention enables use of five simple single or dual actuator valves to perform fluid flow control operations that previously required costly and complex valves. Use of these valves in accordance with the invention still prevents the mixing of different types of fluids running through the same valve assembly, even on failure of one valve seat or valve plug.

While the apparatus hereinbefore described is effectively adapted to fulfill the aforesaid objects, it is to be understood that the invention is not intended to be limited to the specific preferred embodiment of manifold valve assembly set forth above. Rather, it is to be taken as including all reasonable equivalents within the scope of the following claims.

What is claimed is:

1. A manifold valve assembly, comprising: a plurality of valve subassemblies, each of said subassemblies comprising at least five valves,
at least a first one of said valves in each subassembly being in fluid flow communication with a supply source, and at least a second one of said valves in each subassembly being in fluid flow communication with a fluid distribution conduit and at least two, third and fourth of said valves in each subassembly, when open, discharge fluid into a drain, and a fifth valve, when closed, separating said first and third valves from said second and fourth valves, said valves being interconnected by fluid flow conduits to selectively allow flow of fluids from said supply source to said distribution conduit and to prevent flow thereof to a discharge drain.

2. An assembly according to claim 1 wherein said valves in flow communication with said supply source and one of said valves providing for discharge into a drain are both fitted into a single valve cylinder having an inlet port at its top and at least two outlet ports near its bottom.

3. An assembly according to claim 2 wherein said valves in flow communication with said fluid distribution conduit and one of said valves providing for discharge into a drain are both fitted into a single valve cylinder having an outlet port at its top and at least two ports near its bottom.

4. An assembly according to claim 3 wherein each of said valves are fitted into a single valve cylinder are provided with an actuator assembly fitted in said cylinder including: two aligned upper and lower valve actuators, a first actuator rod attached to and actuatable by the uppermost of said actuators, one end of said rod projecting outward from said actuator, a valve stem attached to the projecting end of said actuator rod, having a valve plug for opening and closing said lower outlet port, a second actuator rod attached to and actuatable by said lower actuator, said second rod being in the form of a hollow cylinder concentric and coaxial with said first actuator rod, said first and second rods being independently actuatable by said upper and lower actuators, a hollow cylindrical valve stem attached to the projecting end of said hollow actuator rod, having a valve plug for opening and closing said inlet port, said valve plug having a central opening through which said first actuator is fitted.

5. A assembly according to claim 3 wherein said fifth valve is situated, in each subassembly, in a crossover conduit that connects the valve cylinder in flow communication with said supply source to said cylinder in communication with said distribution conduit.

6. A manifold valve assembly as recited in claim 3 wherein each of said actuators assemblies is carried by a bonnet insertable into its respective valve cylinder, one of said bonnets including a cage portion positioned in said pass-through area, so as to continuously permit flow through the bonnet, said cage portion supporting a valve seat fitted in said inlet port.

7. A manifold valve assembly as recited in claim 1 wherein at least one of said valve plugs is positioned distally relative to its valve seat, so that said valve is opened by extension of the valve actuator rod and closed by retraction thereof.

8. A manifold valve assembly as recited in claim 1 wherein at least one of said valve plugs is positioned proximally relative to its valve seat, so that said valve is opened by retraction of the valve actuator rod and closed by extension thereof.

9. A manifold assembly according to claim 1 wherein, said manifold valve assemblies each include a generally vertical valve cylinder having an inlet port at its top and at least two outlet ports near its bottom, a single actuator valve fitted for closing each of said ports, each including a valve actuator, an actuator rod attached to and actuatable by said actuator, one end of said rod projecting outward from said actuator, and at least one valve plug attached to the projecting end of said actuator rod, at least two of said valves having rods that are coaxial with each other, said rods being independently actuatable by their respective actuators, a hollow cylindrical valve stem attached to the projecting end of said hollow actuator rod, having a valve plug for opening and closing an inlet port, said valve plug having a central opening through which said first actuator is fitted, at least two of said valves having valve plugs for opening and closing outlet ports, and being independently controllable by a valve actuator.

10. A manifold valve assembly as recited in claim 9 wherein at least one of said valve plugs is positioned distally relative to its valve seat, so that said valve is opened by extension of the valve actuator rod and closed by retraction thereof.

11. A manifold valve assembly as recited in claim 9 wherein at least one of said valve plugs is positioned proximally relative to its valve seat, so that said valve is opened by retraction of the valve actuator rod and closed by extension thereof.

* * * * *